(12) United States Patent
Zheng et al.

(10) Patent No.: US 12,067,503 B2
(45) Date of Patent: Aug. 20, 2024

(54) SYSTEM AND METHOD FOR OIL AND GAS PREDICTIVE ANALYTICS

(71) Applicant: RS Energy Group Topco, Inc., Calgary (CA)

(72) Inventors: Jingwen Zheng, Calgary (CA); Qi Zong, Calgary (CA); Stephen Michael Main, Calgary (CA)

(73) Assignee: RS Energy Group Topco, Inc., Calgary (CA)

( * ) Notice: Subject to any disclaimer, the term of this patent is extended or adjusted under 35 U.S.C. 154(b) by 0 days.

(21) Appl. No.: 18/222,695

(22) Filed: Jul. 17, 2023

(65) Prior Publication Data

US 2024/0013073 A1  Jan. 11, 2024

Related U.S. Application Data

(63) Continuation of application No. 17/938,194, filed on Oct. 5, 2022, now Pat. No. 11,748,644, which is a
(Continued)

(51) Int. Cl.
*G06N 5/048* (2023.01)
*E21B 43/00* (2006.01)
(Continued)

(52) U.S. Cl.
CPC ............ *G06N 5/048* (2013.01); *E21B 43/00* (2013.01); *G06F 30/20* (2020.01); *G06F 2111/10* (2020.01)

(58) Field of Classification Search
None
See application file for complete search history.

(56) References Cited

U.S. PATENT DOCUMENTS

| 10,508,532 B1 | 12/2019 | Mondal et al. |
| 2011/0307227 A1 | 12/2011 | Poe |

(Continued)

FOREIGN PATENT DOCUMENTS

| CA | 2943970 A1 | 11/2015 |
| CA | 3035090 A1 | 3/2018 |

(Continued)

OTHER PUBLICATIONS

International Search Report and Written Opinion from counterpart International Application No. PCT/CA2019/050544 dated Jul. 8, 2019.
(Continued)

*Primary Examiner* — Lina Cordero
(74) *Attorney, Agent, or Firm* — DLA Piper LLP (US)

(57) ABSTRACT

Embodiments disclosed herein generally relate to a method and system for oil and gas predictive analytics. A computer system receives a set of production information for a well located in a region. The computing system generates a set of general reference groups comprising one or more reference wells for the region. The computing system determines whether the set of production information for the well includes the threshold amount of production information. The computing system selects a subset of reference wells from the general reference groups based on one or more traits of the well. The computing system generates a reference curve based on the set of production information associated with each reference well in the subset of reference wells. The computing system fits a decline curve to the reference curve, to determine an estimated ultimate recovery of the well.

20 Claims, 9 Drawing Sheets

Related U.S. Application Data continuation of application No. 16/395,608, filed on Apr. 26, 2019, now Pat. No. 11,494,679.

(60) Provisional application No. 62/663,775, filed on Apr. 27, 2018.

(51) Int. Cl.
  *G06F 30/20* (2020.01)
  *G06F 111/10* (2020.01)

(56) References Cited

U.S. PATENT DOCUMENTS

| | | |
|---|---|---|
| 2013/0346040 A1 | 12/2013 | Morales German et al. |
| 2014/0136111 A1 | 5/2014 | Rossi et al. |
| 2016/0260181 A1 | 9/2016 | Singh |
| 2018/0060454 A1 | 3/2018 | Bashore |
| 2018/0202264 A1* | 7/2018 | Sarduy ............... G06N 20/00 |
| 2018/0293336 A1 | 10/2018 | Tao |
| 2018/0335538 A1 | 11/2018 | Dupont et al. |

FOREIGN PATENT DOCUMENTS

| | | |
|---|---|---|
| WO | 2018/039530 A1 | 3/2008 |
| WO | 2015/171799 A1 | 11/2015 |
| WO | 2017/139271 A2 | 8/2017 |

OTHER PUBLICATIONS

International Preliminary Report on Patentability from counterpart International Application No. PCT/CA2019/050544 dated Nov. 5, 2020.
Extended European Search Report dated Dec. 21, 2021, of counterpart European Application No. 19792212.3.
Office Action from corresponding Canadian Patent Appln. No. 3,098,326 dated Feb. 18, 2022.
Office Action from corresponding Canadian Patent Appln. No. 3,098,326 dated Dec. 1, 2022.
Communication Pursuant to Article 94(3) EPC from corresponding European Patent Application No. 19792212.3 dated Apr. 28, 2023.
Office Action dated Oct. 24, 2023, issued in corresponding Canadian Patent Application No. 3,098,326.
Communication pursuant to Article 94(3) EPC dated May 6, 2024, issued in corresponding European Patent Application No. 19792212.3.

* cited by examiner

SYSTEM AND METHOD FOR OIL AND GAS PREDICTIVE ANALYTICS

FIELD OF DISCLOSURE

The present disclosure generally relates to a method and a system for oil and gas predictive analytics.

BACKGROUND

Decline curve analysis is a method used to predict future oil well or gas well production based on past production history. Current technology for performing decline curve analysis, however, is limited. For example, conventional decline curve analysis involves equations that warrant wells to include enough production data such that an accurate model can be determined. Accordingly, conventional decline curve analysis is typically limited to those wells that have already exhibited a decline in production. Further, conventional decline curve analysis is limited to manual processes, in which teams of engineers perform, by hand, curve fitting to production data to a target well. Accordingly, conventional decline curve analyses are prone to human error.

SUMMARY

Embodiments disclosed herein generally relate to a method and system for oil and gas predictive analytics. In one embodiment, a method is disclosed herein. A computer system receives, from a remote computing device, a set of production information for a well located in a region. The set of production information is directed to past production of the well. The computing system parses the set of production information for the well to determine whether the set of production information for the well includes the threshold amount of production information. The computing system generates a set of general reference groups comprising one or more reference wells for the region. Each reference well in the general reference group includes at least a threshold amount of production information. Upon determining that the set of production information for the well does not include a threshold amount of production information, the computing system selects a subset of reference wells from the general reference groups based on one or more traits of the well. The computing system generates a reference curve based on the set of production information associated with each reference well in the subset of reference wells. The computing system fits a decline curve to the reference curve, to determine an estimated ultimate recovery of the well.

In another embodiment, a system is disclosed herein. The system includes a processor and a memory. The memory includes programming code stored thereon, which, when executed by the processor, performs an operation. The operation includes receiving, from a remote computing device, a set of production information for a well located in a region. The set of production information is directed to past production of the well. The operation further includes generating a set of general reference groups comprising one or more reference wells for the region. Each reference well in the general reference group includes at least a threshold amount of production information. The operation further includes parsing the set of production information for the well to determine whether the set of production information for the well includes the threshold amount of production information. The operation further includes upon determining that the set of production information for the well does not include a threshold amount of production information, selecting a subset of reference wells from the general reference groups based on one or more traits of the well. The operation further includes generating a reference curve based on the set of production information associated with each reference well in the subset of reference wells. The operation further includes fitting a decline curve to the reference curve, to determine an estimated ultimate recovery of the well.

In another embodiment, a non-transitory computer readable medium is disclosed herein. The non-transitory computer readable medium includes instructions stored thereon, which, when executed by a processor, cause the processor to perform a method. The operation includes receiving, from a remote computing device, a set of production information for a well located in a region. The set of production information is directed to past production of the well. The method further includes generating a set of general reference groups comprising one or more reference wells for the region. Each reference well in the general reference group includes at least a threshold amount of production information. The method further includes parsing the set of production information for the well to determine whether the set of production information for the well includes the threshold amount of production information. The method further includes upon determining that the set of production information for the well does not include a threshold amount of production information, selecting a subset of reference wells from the general reference groups based on one or more traits of the well. The method further includes generating a reference curve based on the set of production information associated with each reference well in the subset of reference wells. The method further includes fitting a decline curve to the reference curve, to determine an estimated ultimate recovery of the well.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
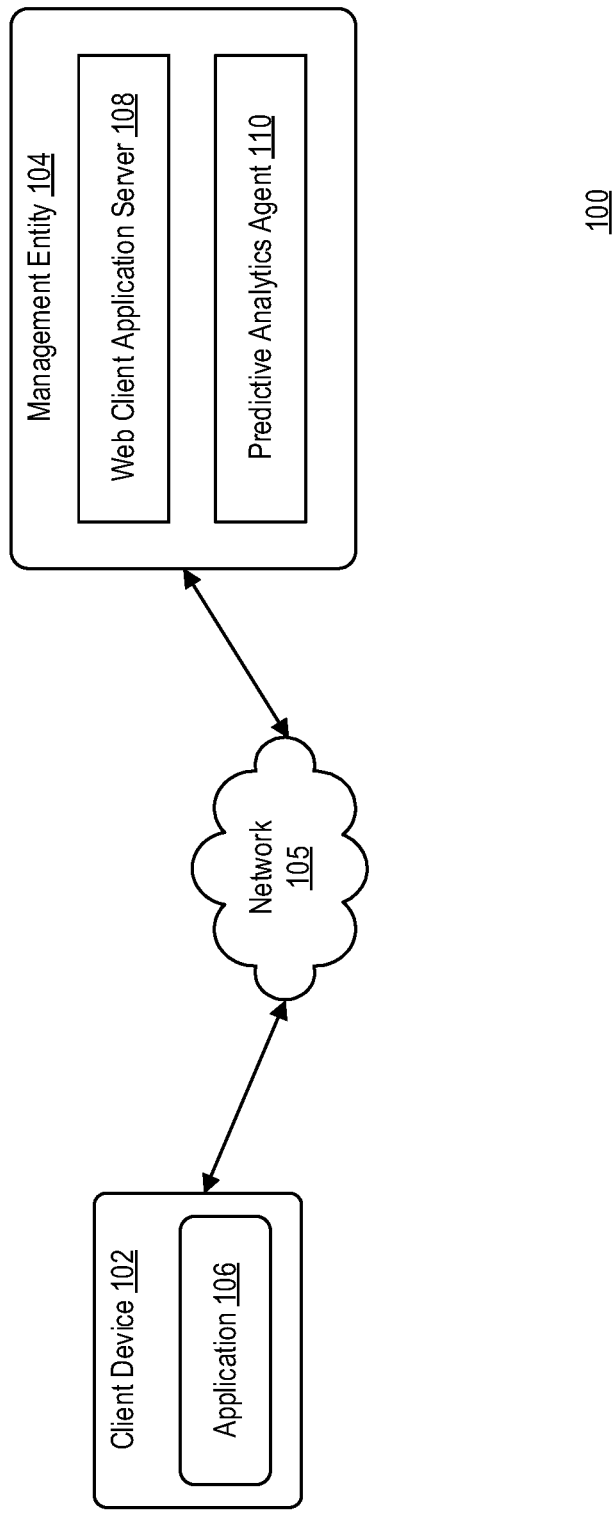
FIG. 1 is a block diagram illustrating an exemplary computing environment, according to one embodiment.

One or more techniques described herein are directed to a method and system for oil and gas predictive analytics. Decline curves are a form of data analysis that may be used to model production rates of oil and gas wells. Decline curve analysis is a way to predict future well production based on past production history. Decline well procedures may be conducted using Arp's Equations (e.g., hyperbolic decline, harmonic decline, exponential decline), where the production rate may be represented as a function of time.

Decline curve analysis is conventionally used with oil and gas wells that have produced an adequate amount of data (e.g., at least one year or more of data). Generally, there are one or more limitations for applying decline curve analysis to newer wells, with only a few months of data. This may be because the decline period of oil/gas well production may not have started (i.e., the oil rate is still increasing), which presents an issue because the Arp's model analyzes decline from a peak. This may also be attributed to there being too few data points for the decline period, which may result in large variances to the fitting of the decline curve and estimating recovery. Since the data may be noisy (i.e., may be meaningless or false), the predicted production trend may change.

Furthermore, the application of decline curve analysis is traditionally highly labor-intensive. Engineers may typically manually generate type curves from a set of similar wells. Such process may create several issues. In one such issue, updating the decline curves for new production information is a labor intensive, manual process, which may introduce one or more human errors over time. Further, grouping similar wells together to draw type curves for a well is deterministically based on categorical variables. The assumption here is that, there is a high similarity between these wells and they should all follow a similar decline trend because they are of the same operator, drilled in the same year, and located within the same area, therefore have similar geological features. However, not all the wells sharing similar categorical features will share similar declines. It is very likely that the wells within the same region may have different decline parameters. Thus, by forcing the wells to share the same geography, operator, vintage parameters, and the like, conventional systems will inevitably make errors for a single well. To resolve the sample size error, engineers would stack all the wells that share the same categorical variables together to create a cumulative production profile to create one decline curve. This one curve is then reassigned back to every well in the group proportional to their cumulative production. As such, unique features of each wells' production profile are lost in the process of normalization and reassignment. This method honors the total production profile of the group at the expense of ensuring the type curve looks predictively the same as the underlying individual well decline. Still further, the evaluation of a best fitted curve for a well is done on a purely visual basis, assisted by manually permutating through various different groups of wells, which is both error-prone and time intensive.

One or more techniques below address the various deficiencies of conventional decline curve analysis systems. For example, the one or more techniques addressed herein eliminate human interaction, in part, by generating a plurality of reference wells for a series of target wells. For each target well, the system identifies whether a candidate well includes enough data points for a decline curve analysis. If the system determines the candidate well does not include enough data points for the decline curve analysis, the disclosed system may then generate a general reference group of wells for the target area (i.e., the area containing the wells to be analyzed). By generating a general reference group of wells, the exemplary disclosed system is able to identify a similar subset of reference wells for a given candidate well, and perform a decline curve analysis on the data points attributed with the reference well. Through this process, the disclosed system both increases the level of accuracy of the decline curve analysis, and also shortens the computational time from several months to several minutes.

FIG. 1 is a block diagram illustrating a computing environment 100, according to one embodiment. Computing environment 100 may include one or more client device 102 and a management entity 104 communicating via one or more networks 105. Client device 102 may be operated by a user. For example, client device 102 may be a mobile device, a tablet, a desktop computer, or any computing system having the capabilities described herein. Client device 102 may execute application 106. In some embodiments, application 106 may be a web browser accessing an application hosted on a remote web server. In some embodiments, application 106 may be installed on client device 102, and execute thereon. Although the below discussion is discussed in conjunction with the embodiment that the application is hosted remotely, those skilled in the art will readily understand that the below description may be applied to application 106 executing on client device 102. Client device 102 may be configured to execute application 106 to access content managed by web client application server 108 of management entity 104. Content displayed to user on client device 102 may be transmitted from web client application server 108 to client device 102, and subsequently processed by application 106 for display through a graphical user interface (GUI) of client device 102.

Client device 102 may communicate with management entity 104 to transmit data to management entity 104 for further analysis. Management entity 104 may include at least a web client application server 108 and predictive analytics agent 110. As recited above, client device 102 may be configured to execute application 106 to access content managed by and/or functionality of web client application server 108 of management entity 104. For example, application 106 may provide an interface between client device 102 and functionality of web client application server 108. In some embodiments, application 106 may allow user of client device 102 to input one or more parameters or files to be analyzed by predictive analytics agent 110. For example, application 106 may allow user of client device 102 to provide one or more parameters directed to oil and gas well analytics or one or more files directed to oil and gas well analytics.

Predictive analytics agent 110 may be configured to forecast future performance of oil and gas wells. For example, predictive analytics agent 110 may receive, as input, a set of data points associated with a performance history of a target well, and perform a decline curve analysis using the set of data points to forecast future performance of oil and gas wells. Predictive analytics agent 110 may be formed from one or more software modules. The one or more software modules are collections of instructions stored on a media (e.g., memory of management entity 104) that represents a series of machine instructions (e.g., program code) that implements one or more algorithmic steps. Such machine instructions may be the actual computer code the processor of management entity 104 interprets to implement the instructions, or, alternatively, may be a higher level coding of the instructions that are interpreted to obtain the actual computer code. The one or more software modules may also include one or more hardware components. One or more aspects of the algorithm may be performed by the hardware components (e.g., circuitry) itself, rather as a result of an instruction.

Figure 2:
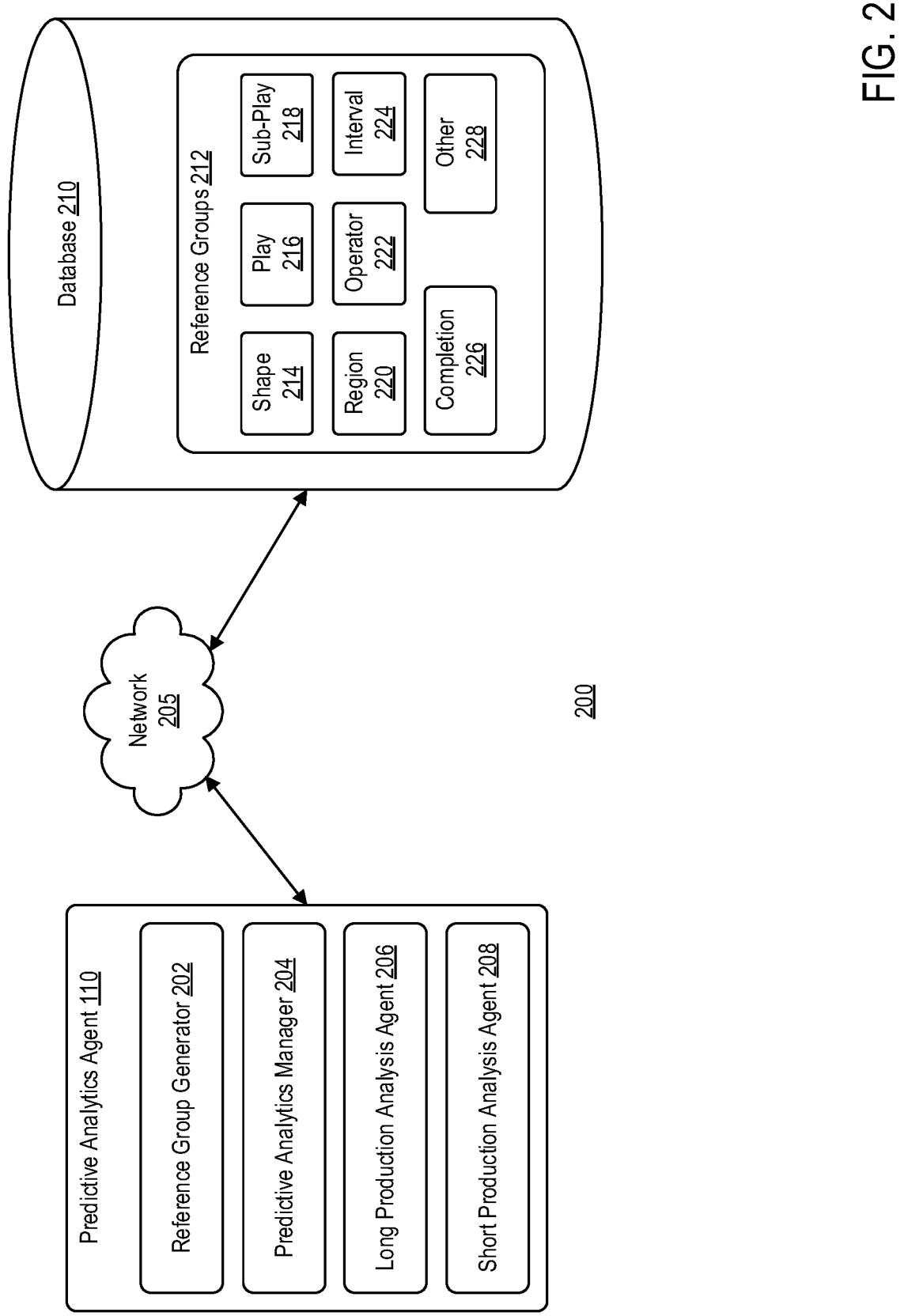
FIG. 2 is a block diagram illustrating exemplary components of the computing environment of FIG. 1 in more detail, according to one embodiment.

FIG. 2 is a block diagram 200 illustrating one or more components of computing environment 100 in more detail. Block diagram 200 includes predictive analytics agent 110 and database 210 communicating over network 205.

Predictive analytics agent 110 may include reference group generator 202, predictive analytics manager 204, long production analysis agent 206, and short production analysis agent 208. Each of reference group generator 202, predictive analytics manager 204, long production analysis agent 206, and short production analysis agent 208 may be formed from one or more software modules. The one or more software modules are collections of instructions stored on a media (e.g., memory of management entity 104) that represents a series of machine instructions (e.g., program code) that implements one or more algorithmic steps. Such machine instructions may be the actual computer code the processor of management entity 104 interprets to implement the instructions, or, alternatively, may be a higher level coding of the instructions that are interpreted to obtain the actual computer code. The one or more software modules may also include one or more hardware components. One or more aspects of the algorithm may be performed by the hardware components (e.g., circuitry) itself, rather as a result of an instruction.

Reference group generator 202 may be configured to generate one or more general reference wells (e.g., greater than 500 reference wells). For example, reference group generator 202 may generate the one or more general reference wells such that the production profile of each reference well meets the threshold requirement for data integrity and availability. The production data of each general reference well may be normalized between [0,1] (min rate=0, max rate=1) by dividing every point on the curve by the curve's peak production. Normalizing the production data of each general reference well aids in comparing the similarity of curve shapes. For example. two curves may have different absolute values regarding their oil rates, but they may have the same decline trend (e.g. they all decline 5% per month). After normalization, comparing the Mean Square Error (MSE) of each curve may more easily illustrate the similarity of their curve shapes.

In some embodiments, the peak may be viewed as the point of transition from initial production segments to production that may be fitted using a given decline curve model (e.g., Arps equations). Accordingly, in some embodiments, reference group generator 202 may normalize to transition point, or modified peak, rather than the actual detected peak.

Predictive analytics manager 204 may be configured to handle requests received from client device 102. In some embodiments, predictive analytics manager 204 may parse one or more sets of data received from client device 102 in the request. In some embodiments, predictive analytics manager 204 may access a file uploaded by client device 102 to management entity 104 and, subsequently, parse the set of data contained therein. In some embodiments, client device 102 may request analysis on at least one well within a region, and predictive analytics manager 204 may pull (or retrieve) data directed to at least one well from a database. Generally, the data received by predictive analytics manager 204 may be corrected, multi-sourced completion and production information, such as RS Data™ delivered through RS Prism™ platform, commercially available from RS Energy Group. In some embodiments, predictive analytics manager 204 may be configured to integrate with platforms from RS Energy Group, but may be scaled to other sources of data.

Predictive analytics manager 204 may be configured to pre-process the received sets of production information. For example, predictive analytics manager 204 may pre-process the received sets of production information such that the production information is normalized within a pre-defined range. In some embodiments, pre-processing the production data includes re-computing (or smoothing) duplicate values, removing one or more outliers, removing any identified downtime, and, subsequently, normalizing the data set.

In some embodiments, predictive analytics manager 204 may parse the production information for the target well to identify and remove all zero production records from the production information. For example, occasionally, operators may shut-in wells for various reasons, thus resulting in downtime. The goal for predictive analytics manager 204 would be to ensure that all zero production months are removed and tracked, so as to not bias the analysis. In some embodiments, predictive analytics manager 204 may collapse the curve by omitting the zeros production months, and calculate calendar daily production values (e.g., by dividing the monthly information by 365/12).

For example, production information may be:

$$Prod=[1000,900,800,0,0,600,500,400]$$

Predictive analytics manager 204 may remove the zero production months, generating the set:

$$Prod_{removed_{downtime}}=[1000,900,800,600,500,400]$$

Months of downtime=[4,5]

Further, in some embodiments, predictive analytics manager 204 may parse the production information of the target well to smooth duplicate values. Such situation may arise for target wells that report production information periodically (e.g., every 3 and 6 months), which results in duplicate values. Predictive analytics manager 204 may smooth or re-compute duplicate values such that the data reflects a downward sloped production. Predictive analytics manager 204 may, for example, identify duplicated series of data, re-compute smoothed values, and replace the duplicated value out of the time series with re-computed values.

For example, assume the production information takes the form:

$$Prod=[1000,1000,1000,800,700,600,600,600,600,550,400,300,300,300]$$

Accordingly, the duplicate count would be:

$$Dup_{count}=[3,1,1,4,1,1,3,]$$

In some embodiments, predictive analytics manager 204 may change each duplicated value by $\Delta d$. If, for example, the duplicate values occur in the beginning of the production information, then predictive analytics manager 204 may compute a third of the absolute difference of the last value of the duplicate and its nearest neighbor. For example, using the production information above, the duplicate [1000, 1000, 1000] occurs at the beginning of the production information. This would yield:

$$\frac{abs(1000 - 800)}{3}.$$

If, for example, the duplicate occurs at the end of the production information, then predictive analytics manager 204 may compute a third of the absolute difference of the first value of the duplicate and its previous neighbor. For example, using the production information above, the duplicate [300, 300, 300] occurs at the end of the production information. Accordingly, this would yield:

$$\frac{abs(300 - 400)}{3}.$$

If, for example, the duplicate occurs in the middle of the production information (i.e., not at the end or the beginning), then predictive analytics manager 204 may compute a third of the minimum of the absolute difference of the two ends of the time series. For example, using the production information above, the duplicate [600, 600, 600, 600] occurs in the middle of the production information. Accordingly, this would yield:

$$\min\left(\frac{abs(600 - 700)}{3}, \frac{abs(600 - 550)}{3}\right).$$

Given $\Delta d$, predictive analytics manager 204 may assign smoothed values for the duplicates by creating an arithmetic series with an augmented beginning value and a diminished ending value. For example, given duplicated time production series:

$q \in \{q_1, q_2, q_3, \ldots, q_t\}$, where $i \in \{1,2,3, \ldots, t\}$ and $q_n = q_m \forall n, m \in \{1,2,3, \ldots, t\}$ predictive analytics manager 204 may define modified production that for each $q_i$ value to be $m_i$, where $m_i = \{m_1, m_2, m_3, \ldots, m_t\}$, where $m_1$ is the modification of $q_i$. Accordingly, predictive analytics manager 204 may (1) assign $m_1 = q_1 + \Delta d$, and $m_t = q_t - \Delta d$; (2) create $$\Delta q = \frac{m_t + m_1}{t - 1};$$

and (3) assign $m_i = m_{i-1} - \Delta q$.

For example, for duplicated values [600, 600, 600, 600], predictive analytics manager 204 may define $$\Delta d = \min\left(\frac{700 - 600}{3}, \frac{600 - 550}{3}\right) = \min(33.33, 16.67) = 16.67.$$

Predictive analytics manager 204 may then assign m1=600+16.6 and m t=600-16.67. Predictive analytics manager 204 may create $$\Delta q = \frac{m_1 - m_t}{L - 1} = \frac{616.67 - 583.33}{3} = \frac{33.34}{3} = 11.11.$$

Accordingly, this may result in [616.67, 605.56, 594.44, 583.33].

In some embodiments, predictive analytics manager 204 may identify a set of value(s) that deviate from expectation. For example, predictive analytics manager 204 may identify particular values that greatly exceed the rest of the data points in the production information, and would replace them with more sensible ones. In some embodiments, outliers may be caused due to corrupted extract, transform, and load procedures, which could negatively impact the predictability of the model. Predictive analytics manager 204 may identify and replace outliers by computing the difference between the outlier point and its n-month moving average. If the difference exceeds a certain threshold, predictive analytics manager 204 may flag it as an outlier, and replace it with a more reasonable value.

For example, predictive analytics manager 204 may receive the following production information:

Prod=[1050,900,800,750,600,50000,400,300,200, 150]

Predictive analytics manager 204 may generate a moving average (MA), such as:

MA=[NA,917,817,717,17117,17000,16900,300,217, NA]

Predictive analytics manager 204 may then compute the difference between the points in the production information and the moving average. For example:

Diff=[NA,−17,−17,33,−16517,33000,−16500,0,−17, NA]

Assuming, that the threshold is the 75th percentile of the production information (i.e., 875), predictive analytics manager may compare the difference value to the threshold. For example, Diff>Threshold=[F,F,F,F,F,T,F,F,F,F]

In some embodiments, predictive analytics manager 204 may override the first X-months of production as a "never outlier" because peak values tend to occur in early months. Accordingly, continuing with the above example, predictive analytics manager may identify the outlier to be the fifth month (i.e., 50000).

Predictive analytics manager 204 may then replace the identified outlier with a replacement value. The replacement value may be the mean of the valid production values after x-months (not including outliers). In some embodiments, x=3. Accordingly, predictive analytics manager 204 may compute the mean of:

Mean[NA,NA,NA,750,600,NA,400,300,200,150]=400

Accordingly, the final production values may be:

Final Prod=[1050,900,800,750,600,400,400,300,200, 150]

For example, long production analysis agent 206 may calculate a pre-defined moving average (both before and after) each record $q_{MA}$. Predictive analytics manager 204 may compare actual values, q, to moving average values $q_{MA}$. Predictive analytics manager 204 may identify an outlier if the difference, $d_{MA} = (a - q_{MA})$ is larger than a percentile (e.g., 65%) of the whole raw data set. If, the value preceding the outlier is sensible (i.e. fits with the production information), then long production analysis agent 206 may replace the outlier with the previous value. Otherwise, long production analysis agent 206 may replace the outlier with the mean value of the curve.

Still further, in some embodiments, predictive analytics manager 204 subsequently normalizes the filtered production information. For example, predictive analytics manager 204 may normalize the filtered production information such that each target well is normalized to its peak values using:

$$q_{norm} = \frac{q}{q_{max}},$$

After normalization, each value in the production information associated with each well is within the range of [0,1].

For each well in the request, predictive analytics manager 204 may further be configured to determine if there is at least a threshold amount of production information in the set of data for analysis. As recited above, conventional approaches to forecasting future performance of oil and gas wells using decline curve analysis are unable to forecast future performance of wells having insufficient production information. Accordingly, predictive analytics manager 204 may be configured to set a threshold amount of production information for forecasting future performance of oil and gas wells. In some embodiments, the threshold amount of production information may be point based. For example, predictive analytics manager 204 may set the threshold amount of production information to three data points. In some embodiments, the threshold amount of production information may be duration based. For example, predictive analytics manager 204 may set the threshold amount of production information to span a pre-defined duration (e.g., 15 months of production information).

In some embodiments, the determination as to whether there is at least the threshold amount of production information in the set of data for analysis may affect the future use of the target well as a subsequent reference well. In other words, predictive analytics manager 204 may also determine whether a given target well has sufficient information to act as a reference well for future well analysis.

In some embodiments, predictive analytics manager 204 may be configured to classify one or more segments of each target well. For example, depending on the reservoir characteristics, how the well is being operated, and outlier events during a target well's life, the production profile may deviate from curve analysis. Accordingly, predictive analytics manager 204 may utilize step detection (or edge detection) to partition the curve at various points of changes in the mean level of a time series to treat variations of production profiles. In some embodiments, predictive analytics manager 204 may classify each segment of the target well based on reservoir characteristics (e.g., transition between transient flow and boundary dominated flow may mean the need to fit multiple segments), operator adjustments (e.g., operators may choose to choke the well and/or employ different enhanced oil recovery (EOR) techniques), and interference events (e.g., re-completion, re-entry, down-spacing of nearby wells, along with interference of nearby drainage systems may affect decline profiles).

Predictive analytics manager 204 may partition a curve representing production information of a target well into one or more segments using step detection by reducing (e.g., minimizing) variation within segments at different points of partition. For each segment, predictive analytics manager 204 may record its position, the length of the segment, and classify it into downward, plateau, or upward segments. Predictive analytics manager 204 may assign each segment a curve type based on the combination of the segment position, segment trend, and segment length. Once predictive analytics manager 204 defines each segment as increasing trend, plateau, decreasing trend by completion, predictive analytics manager 204 may implement a peak detection algorithm to truncate the segment from the peak of decline. In some embodiments, predictive analytics manager 204 may only select a curve with a peak, i.e., a curve that is declining, as a production stream to be fitted.

Figure 7:
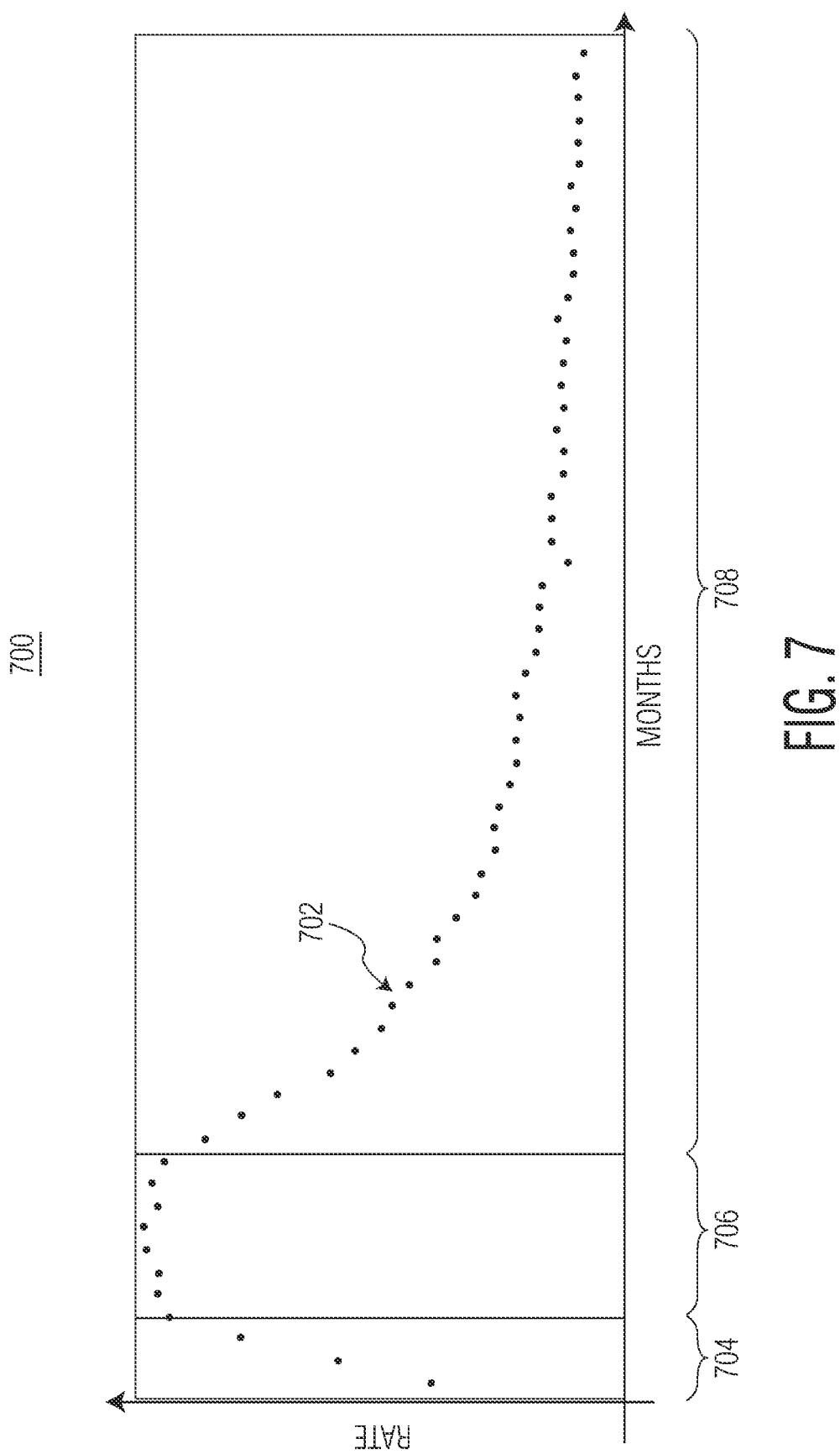
FIG. 7 is a block diagram illustrating an exemplary timeplot, according to example embodiments.

FIG. 7 is a block diagram illustrating an exemplary timeplot 700, according to example embodiments. Timeplot 700 may illustrate the rate (y-axis) across a given time (x-axis). As shown, timeplot 700 plots the rate against the time in months. Predictive analytics manager 204 may partition a curve 702 into three segments: a first segment 704, a second segment 706, and a third segment 708. First segment 704 may corresponds to an increase in trend. Second segment 706 may correspond to a plateau (or controlled pressure). Third segment 708 may correspond to a declining rate. Third segment 708 may be used by predictive analytics manager 204 in a subsequent decline curve analysis and/or use as a reference curve.

Figure 8:
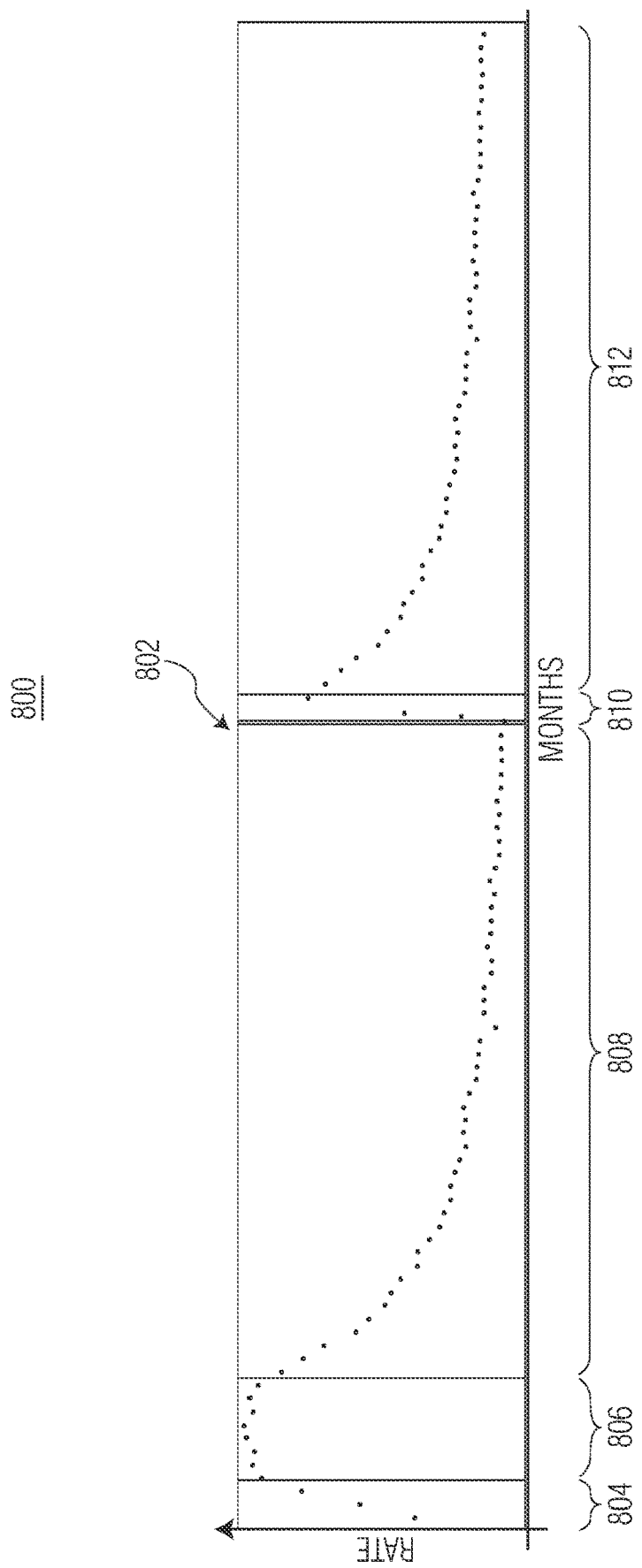
FIG. 8 is a block diagram illustrating an exemplary timeplot, according to example embodiments.

FIG. 8 is a block diagram illustrating an exemplary timeplot 800, according to example embodiments. Timeplot 800 may illustrate the rate (y-axis) across a given time (x-axis). As shown, timeplot 800 plots the rate against the time in months. Predictive analytics manager 204 may partition a curve 802 into five segments: a first segment 804, a second segment 806, a third segment 808, a fourth segment 810, and a fifth segment 812. First segment 804 may correspond to an increasing trend. Second segment 806 may correspond to a plateau. Third segment 808 may correspond to a declining rate. Fourth segment 810 may correspond to an increasing trend. Fifth segment 812 may correspond to another decreasing trend. Predictive analytics manager 204 may utilize both third segment 808 and fifth segment 812 in subsequent decline curve analyses and/or use as reference curves. In other words, predictive analytics manager 204 may truncate segments that are declining from the peak, and use those segments in subsequent analysis. When multiple segments are identified, in some embodiments, they may be referred to as "first segment" and "later segment."

In some embodiments, predictive analytics manager 204 may fit curves from a "peak" producing rate (e.g., within the first few months of production). In some cases, the peak may be viewed as the point of transition from initial production segments to production that may be fitted using a given decline curve model (e.g., Arps equations). In some cases, however, predictive analytics manager 204 may use transition point detection schemes to account for more complex scenarios, such as, but not limited to, unpredictable rates of production in earlier months and restricted production (e.g., short term enhanced recovery, long term infrastructure capability limits).

Predictive analytics manager 204 may utilize a transition point identification algorithm for choosing a transition point (e.g., best transition point) for slow early decline or multiple peak candidates. For example, predictive analytics manager 204 may sort the time series data for the target well and identify the n largest values. For example:

$mean_{peaks}$=mean of $n$ largest peaks

Predictive analytics manager 204 may define the following variables:

upper_boundary, lower_boundary (expressed as a percentage of the mean$_{peaks}$)

decline_threshold_pc (the decline threshold expressed as a percentage)

In some embodiments, each value in the time series may be tested in a sequence. In some embodiments, predictive analytics manager 204 may identify peaks where the decline from the previous value is less than (1−decline_threshold_pc) and above the upper_boundary. In some embodiments, if the previous point was identified as a valid peak position, predictive analytics manager 204 may move that point to the current test position. In some embodiments, predictive analytics manager 204 may add the peak position to a list of candidates (peak_list) once the value of the points fall below the lower_boundary. In some embodiments, before adding the candidate peak, predictive analytics manager 204 may recheck the value of the previous point. If the previous point is the highest of the recent three points and higher than the candidate peak by a certain threshold (e.g., pre 1 threshold), then predictive analytics agent 204 may change the candidate peak to the previous point. In some embodiments, the final peak to the peak_list may be considered the transition point. If, however, no peak is found, then predictive analytics agent 204 may repeat the above processes after increasing decline_threshold_pc by 1% until a peak is found.

In an example in which only a single candidate peak has been identified, the following thresholds may be defined as pre_1_threshold (e.g., 1.03), pre_2_threshold (e.g., 1.05), pre_3_threshold (e.g., 1.1), where pre_3_threshold>pre_2_threshold>pre_1_threshold. Predictive analytics manager 204 may compare the three previous points to the chosen peak value multiplied by the corresponding thresholds. If the point prior to the peak is the maximum of the entire curve and greater than pre_1_threshold times chosen peak value, then predictive analytics manager 204 may change the chosen peak to that peak. If two points prior to the peak is the maximum of the entire curve and greater than pre_2_threshold times chosen peak value, predictive analytics manager 204 may change the chosen peak to that peak. If three points prior to the peak is the maximum of the entire curve and greater than pre_3_threshold times chosen peak value, then predictive analytics manager 204 may change the chosen peak to that peak.

In an example in which multiple peaks have been identified, predictive analytics manager 204 may compare the latest two peaks. If the latest two peaks are within six points of each other and the penultimate candidate peak is greater than pre_3_threshold times last candidate peak value, predictive analytics agent 204 may use the penultimate peak as the chosen peak.

In some embodiments, predictive analytics manager 204 may use a brute force method to identify a transition point. For example, predictive analytics manager 204 may fit a decline curve to a set of candidate transition points. Predictive analytics manager 204 may calculate the root mean square error for each fitted curve. The curve with the lowest root mean square error is identified as the correct transition point.

In some embodiments, where production rate is found to be within a narrow threshold band for several months, the completion of a well may be labeled as "restricted." Predictive analytics manager 204 may divide the reference completions into restricted and unrestricted groups. Predictive analytics manager 204 may identify the peak rate by looking at the target completion's test rate or actual peak rate. Reference curve (unrestricted) may be used to calculate a decline profile for a similar, but restricted completion. This decline may be scaled to the peak or test rate to determine the number of months before a similar, but restricted, completion would have declined to the restricted rate of production.

Predictive analytics manager 204 may then determine whether each identified segment includes at least a threshold amount of production information. In some embodiments, the threshold amount of production information may be point based. For example, predictive analytics manager 204 may set the threshold amount of production information to three data points. In some embodiments, the threshold amount of production information may be duration based. For example, predictive analytics manager 204 may set the threshold amount of production information to span a predefined duration (e.g., 15 months of production information).

Based on the determination, predictive analytics manager 204 may pass control to one of long production analysis agent 206 or short production analysis agent 208. For example, upon determining that a given segment (e.g., decline trend segment) includes at least the threshold amount of production information in the set of data for analysis, predictive analytics manager 204 may pass control to long production analysis agent 206 for forecasting future performance of the segment (or well). In another example, upon determining that a given segment does not include at least the threshold amount of production information in the set of data for analysis, predictive analytics manager 204 may pass control to short production analysis agent 208 for forecasting future performance of the segment (or well).

Long production analysis agent 206 may be configured to forecast future performance of a well that includes at least the threshold amount of production information for a given segment. Long production analysis agent 206 may be configured to forecast future performance of the well using one or more decline curve analyses. For example, long production analysis agent 206 may generate one or more decline curves using Arps Equations. In other examples, long production analysis agent 206 may generate one or more decline curves using one or more of Bayesian probabilistic decline curve analysis, Fetkovich, Blasingame and Agarwal-Gardner type curve methods, Duong decline curve model, stretched exponential decline, multi-segment decline model, power law decline, logistic growth model, Gringarten type curve analysis, Wattenbarger type curve analysis, or any suitable type of method.

Short production analysis agent 208 may be configured to forecast future performance of a well that does not include at least the threshold amount of production information. In particular, short production analysis agent 208 may leverage the set of general reference wells generated by reference well generator 202 to aid in forecasting future performance of a target well. For example, from the pool of general reference wells, short production analysis agent 208 may select a minimum number of reference wells based on one or more characteristics of those reference wells. For example, reference group generator 202 may select one or more reference wells (e.g., 500) based on one or more well characteristics, which include, but are not limited to, the type of well (e.g., oil vs. gas), an orientation of the well (e.g., horizontal vs. vertical), shape of the well production profile, depth of the well, width of the well, length of the well, completion of the well, geology of the region in which the well is located, and the like.

In some embodiments, short production analysis agent 208 may perform the following algorithm to select a subset of reference wells similar to the target well. In general, the reference wells generated by reference well generator 202 may be sorted in a hierarchical level. For example, the hierarchy of reference wells may take the form of Trajectory>Region>Basin>Play>SubPlay>Interval> Operator>Proppant Intensity Grouping. Short production analysis agent 208 may begin by identifying all potential reference wells that have the same features as the above hierarchical levels. Short production analysis agent 208 may transform the additional wells into the general reference group wells generated by reference well generator 202.

From the general reference group wells, short production analysis agent may identify a pool of reference wells (e.g., 500 reference wells) based on a degree of granularity, according to the above hierarchy. For example, for a target well in Permian (region), North Oil (basin), Midland (play), Howard (subplay), WC (interval), PXD (operator), the short production analysis agent 208 may identify a set of wells that satisfy the constraints of Permian-North Oil-Midland-Howard-WC-PXD, and then decide if this set has at least 500 wells in it. If not, the system broadens the search to Permian-North Oil-Midland-Howard-WC, and continues to broaden the search until at least 500 wells are identified.

In some embodiments, short production analysis agent 208 may identify similar wells based on three broad categories: discrete, time and date, and continuous.

Discrete factors may include, but are not limited to: Well_ID, Completion_ID, Well_API, RS_Well_Type, Current_Well_Name, Wellpad_ID, Lease_Number, County, State, Country, Section, Township, Range, Field, Block, District, Platform_Name, Current_Well_Status, RS_Region, RS_Basin, RS_Play, RS_SubPlay, RS_Interval, Current_Operator, Current_Formations, RS_Prod_Well_Type, Raw_Operator, First_Operator, RS_Ticker, Well_Service_Provider, Direction, Fluid_Type, Completion_Design, Proppant_Type, Proppant_Brand.

Time and Date factors may include, but are not limited to: Spud_Date, Date_Updated_Well, Fracture_Date, Drilling_Start_Date, Drilling_End_Date, RS_CompInserted_Date, Date_Updated_Completion, Test_Date, First_Producing_Year, First_Producing_Month.

Continuous factors may include, but are not limited to: Choke_Size, Permit_To_Spud, Spud_To_Rig_Release, Spud_To_Completion, Spud_To_Sales, Soak_Time, Total_Water_Volume_Gal, Water_Intensity_Gal_Per_Ft, Fluid_Intensity_BBLPerFt, Proppant_Loading_LbsPerGal, Test_Oil_Percentage, Last_Month_Oil_Percentage, Total_Test_Rate, Total_Test_Rate_MCFE, Average_Stage_Spacing, Well_Pad_Count, x-coordinate, y-coordinate, True_Vertical_Depth, Elevation, Total_Gas_BOE, Current_Oil_Gatherer, Water_Depth, TVD_Top, TVD_Base, Subsea, Interval_From_Ft, Interval_To_Ft, Number_of_Stages, Frac_Job_Length_Dates, Total_Measured_Depth_Ft, Lateral_Length_Ft, Perf_Interval, Toe_Angle_Against_Ground, Isopach, Gamma_Ray, Bulk_Density, Resistivity, Density_Porosity, Effective_Porosity, Clay_Volume, Non_Clay_Volume, Water_Saturation, PhiH, HCPV, HHPV, Mud_Weight_Index, Reservoir_Temperature, Mud_Derived_Reservoir_Pressure, TOC, Biocide_Mass, Breaker_Mass, Buffer_Mass, Clay_Control_mass, Crosslinker_Mass, Friction_Reducer_Mass, Gelling_Agent_Mass, Iron_Control_Mass, Scale_Inhibitor_Mass, Surfactant_Mass, Energizer_Mass, Diverter_Mass, Injection_Pairing, Variable_Operating_Cost, Transportation, Fixed_Monthly_Cost, Processing_Fee, General_And_Administrative_Costs, Oil_Severance_Tax, NGL_Severance_Tax, Nat_Gas_Severance_Tax, Drill_Cost, Completion_Cost, Tie_In_And_Facilities, Total_Well_Cost, Gas_Shrink, NGL_Yield, Drainage, Total_Opex.

Short production analysis agent 208 may group wells at multiple levels. In some embodiments, short production analysis agent 208 may group wells that share the same discrete traits. In some embodiments, short production analysis agent 208 may group wells based on well or completion age. In some embodiments, short production analysis agent 208 may group wells or completions that have a similar producing rate curve shape (e.g., month/rate). In some embodiments, short production analysis agent 208 group wells based on similarity with continuous traits.

For grouping of wells in accordance with their discrete traits, any number, n, of well traits may be used to create a set of groups where wells/completions share the same values for all n traits. In some embodiments, n−1 additional sets of groups may be created to establish n levels of grouping sets where well/completions within the same level n group may share the same values for all n traits. In some embodiments, where the traits chosen have an actual or strongly implied hierarchy:

the level n−1 set may constitute groups comprising one less combination of traits than those of the level n set;
the level n−2 set may constitute groups comprising one less combination of traits than those of the level n−1 set; and
continuing this process until the level 1 set comprises groups that share the same value of a single trait (e.g., the trait at the top of the hierarchy).

In some embodiments, continuous traits may be used as though they are discrete traits by dividing ranges of continuous values into "bins" or "buckets" over all wells/completions.

In some embodiments, such as that for individual target wells, short production analysis agent 208 may select a matching trait group set at a level that provides a sufficiently large number of reference wells in the matching group. Short production analysis agent 208 may establish a reference group count threshold (e.g., ref_threshold) at a global level or macro level (e.g., play or sub-play). Starting at the highest group level, L, a group set matching all L corresponding traits of the target well may be sought by short production analysis agent 208. For example, if a matching group is found, then the number of wells in the group, R, may be compared against the ref_threshold. If there are more completions in the group, then short production analysis agent 208 may select that group as a suitable group of reference completions for the target well. If, however, short production analysis agent 208 finds that no matching group in the level set exists or that the number of wells in the matched group does not exceed ref_threshold, then short production analysis agent 208 may repeat the process for level L−1, and so on until a sufficiently large group is found.

In some embodiments, short production analysis agent 208 may use database 210 (e.g., a GPU accelerated database) with dictionary encoding techniques to precompute the trait combination that define all possible groupings at each level, depending on the level scheme chosen. In some embodiments, short production analysis agent 208 may use database 210 to calculate and assign unique reference keys and the sizes of all groups. For example, for each individual well/completion, short production analysis agent 208 may calculate the group memberships, corresponding reference keys, and group size using join functionality that may be accelerated using database 210. The chosen group, depending on threshold size, may be precomputed.

In some embodiments, the sub-group selection within a chosen group described above may be accelerated by dividing all target wells into manageable sized partitions. In some embodiments, short production analysis agent 208 may replicate the selected group reference data across those partitions. The wells in a partition may be fitted serially, one at a time, or with some degree of multi-threaded processing. In some embodiments, this process may occur on all partitions simultaneously and in parallel. In some embodiments, performance may be accelerated and this process may be scaled to hundreds of millions of wells by, for example, increasing the number of partitions and providing sufficient additional computing hardware to support simultaneous calculation of the additional partitions.

In conventional systems, the above process to generate type curves for a basin such as Eagle Ford (which includes about 25,000 wells) may take a team of three or four engineers several months to complete. With the present techniques, such process may be completed in as little as five minutes.

In some embodiments, short production analysis agent may group the wells/completions based on well or completion age. For example, the producing rate time series of the reference well/completions chosen by a higher level grouping (e.g., trait grouping) may be ordered by time series length and a proportion, p, or absolute number, P, of the shorter time series within the group may be chosen. These may generally correspond to the younger well/completions within the group. P or p may be configured at a global or macro level (e.g., play or sub-play). In cases where the reference curve population may include curves that are younger than the target, short production analysis agent may compare the reference curve length to the target curve length. In some embodiments, wells that are longer than the target well are preferred. If, for example, there are not enough of these longer reference curves to reach the desired proportion, p, or the absolute number, P, then curves that are shorter than the target curve may be included (from longest to shortest) until the desired population of the reference curves is fulfilled.

In some embodiments, short production analysis agent 208 may group wells that have similar producing rate curve shapes (e.g., month/rate). For example, short production analysis agent 208 may normalize the producing rate time series of the reference group and the target completion to the rate of the detected transition points of each reference curve. Short production analysis agent 208 may compare the shapes of the target and the reference time series by calculating the root mean square error between the two time series. In some embodiments, short production analysis agent 208 may perform this comparison for the whole time series duration of the target curve and the whole time series duration of the references up to a length equivalent to the length of the target time series. In some embodiments, short production analysis agent 208 may compare the comparable period following the transition points of the references and the targets.

In some embodiments, short production analysis agent 208 may select a set of categorical variables (e.g., categorical features) and a set of numerical variables (e.g., numerical features), and attach them to each well. For example, categorical features may include RSBasin, RSPlay, RSSubplay, RSInterval, RSOperator, Proppant Type, etc. Numerical features may include latitude, longitude, TVD, lateral length, proppant intensity, etc. When comparing the target well with the wells in the general reference pool, short production analysis agent 208 may calculate the pair-wise dissimilarity distances of categorical features and numerical features. In some embodiments, the dissimilarity distance of categorical features may be calculated with fuzzy string match. In some embodiments, the dissimilarity distance of numerical features may be calculated via Euclidean distance. Using this information, short production analysis agent 208 may generate a single pairwise distance, coined here as the Hellbender Distance, that may measure the similarity between the target well and a reference well that includes both dissimilarity of string/categorical variables and continuous variables. Short production analysis agent 208 may then generate a distance matrix that compares the target curve against the group of reference wells. Short production analysis agent 208 may transform the distance matrix into a coordinate system that preserves the pairwise distance. For example, short production analysis agent 208 may use multi-dimensional scaling to project the distance matrix into a three-dimensional space, while preserving the pair-wise Hellbender Distance. Short production analysis agent 208 may then use one or more clustering techniques to find peer groups for the target well. Exemplary clustering technique may include, but are not limited to, k-means clustering, hierarchical clustering, expectation maximization clustering, and the like. Short production analysis agent 208 may also perform linkage analysis on the distance matrix to create possible agglomerative clustering variations given a threshold of variance or average distance within each cluster.

Within the identified pool of reference wells, short production analysis agent 208 may identify a subset of more similar wells based on the similarity of the production profile between the target well and each reference well in the pool of reference wells. For example, short production analysis agent 208 may select a subset of reference wells within the pool of 500 reference wells, by identifying those reference wells (e.g., 10 reference wells) that are most similar to the target well, within a certain degree of similarity. The calculation of similarities may be based, for example, on the number of months of production information existing for the target well. For example, if the target well has 14 months of production data after it peaked, short production analysis agent 208 may look for similarities between the target well and the first 14 months of production data from the 500 wells selected as the pool of reference wells.

In some embodiments, for groups based on similarity with traits with continuous values, short production analysis agent 208 may define a set C, of continuous traits. For each trait in C, the value of the trait for the target well may be compared with the same trait in all reference wells. Short production analysis agent 208 may normalize these differences to the largest different within the comparison reference group. In some embodiments, short production analysis agent 208 may normalize these differences to some larger group of reference curves. Short production analysis agent 208 may repeat this process for every train in C, and for all reference curves in the comparison group. Short production analysis agent 208 may generate a score for each comparison reference curve as the sum of the normalized differences for each trait. Reference curves with the lower scores may be a closer match than those with higher scores. Short production analysis agent 208 may select a sub-population of the best matching reference curves (e.g., set of N most similar curves) from the comparison group.

In some embodiments, short production analysis agent 208 may average the normalized, or pre-processed data for groups of reference curves to provide an average representation of the shape of time series for the group. Due to the varying length of the reference curves, short production analysis agent 208 may prevent survivorship bias by truncating the total number of month of all reference wells. That is in a group of 100 reference curves, if 50 wells have 75 months of production, 10 wells have 65 months of production, and 40 wells have 50 months production. Then given a 60% representation cutoff, we will have an average curve that is 65 months long. Because at 65 months, the number of curves used to compute the $65^{th}$ month of data point is 60 out of 100 wells, or 60%. At $50^{th}$ month, we can use all 100 wells, but we also want to leverage information from longer periods of decline, therefore a x % representation where x %<100% is used. In this case, each reference curve has equal weight in the computation of the average curve.

To account for survivorship basis, short production analysis agent 208 may use an alternative path, where all reference wells are first fitted so that each would have more than X months (e.g., 360) of data. Short production analysis agent 208 may use the average of these fitted curves as input.

To account for outliers in the reference wells that were not accounted for by the Hellbender Distance, short production analysis agent 208 may regress the target curve against all reference wells and catch the parameter in a linear regression. This may allow short production analysis agent 208 to compute a weighted average curve to be inputted into subsequent curve fit analyses.

Short production analysis agent 208 may generate a reference curve for the target well by averaging all the curves generated for each reference well in the subset of N most similar reference wells. Short production analysis agent 208 may fit a decline curve to the generated reference curve. Short production analysis agent 208 may apply curve parameters (e.g., qi, b, Di) to the target well to forecast its future performance. Such procedure described above may also account for outlier production behaviors such as chocked wells, wells with late peak month, wells with re-completions, and many others that are unique to individual operator producing in certain region given a certain vintage.

From the decline curve, short production analysis agent 208 may generated an estimated ultimate recover (EUR) of the target well.

Predictive analytics agent 110 may communicate with database 210. Database 210 may be configured to store one or more reference groups 212 generated by reference group generator 202. The reference wells generated by reference group generator 202 may be stored according to one or more characteristics of the well. As illustrated, the one or more reference wells of reference groups 212 may be stored according to shape 214, play 216, sub-play 218, region 220, operator 222, interval 224, completion 226, or any other suitable set of criteria 228.

Figure 3:
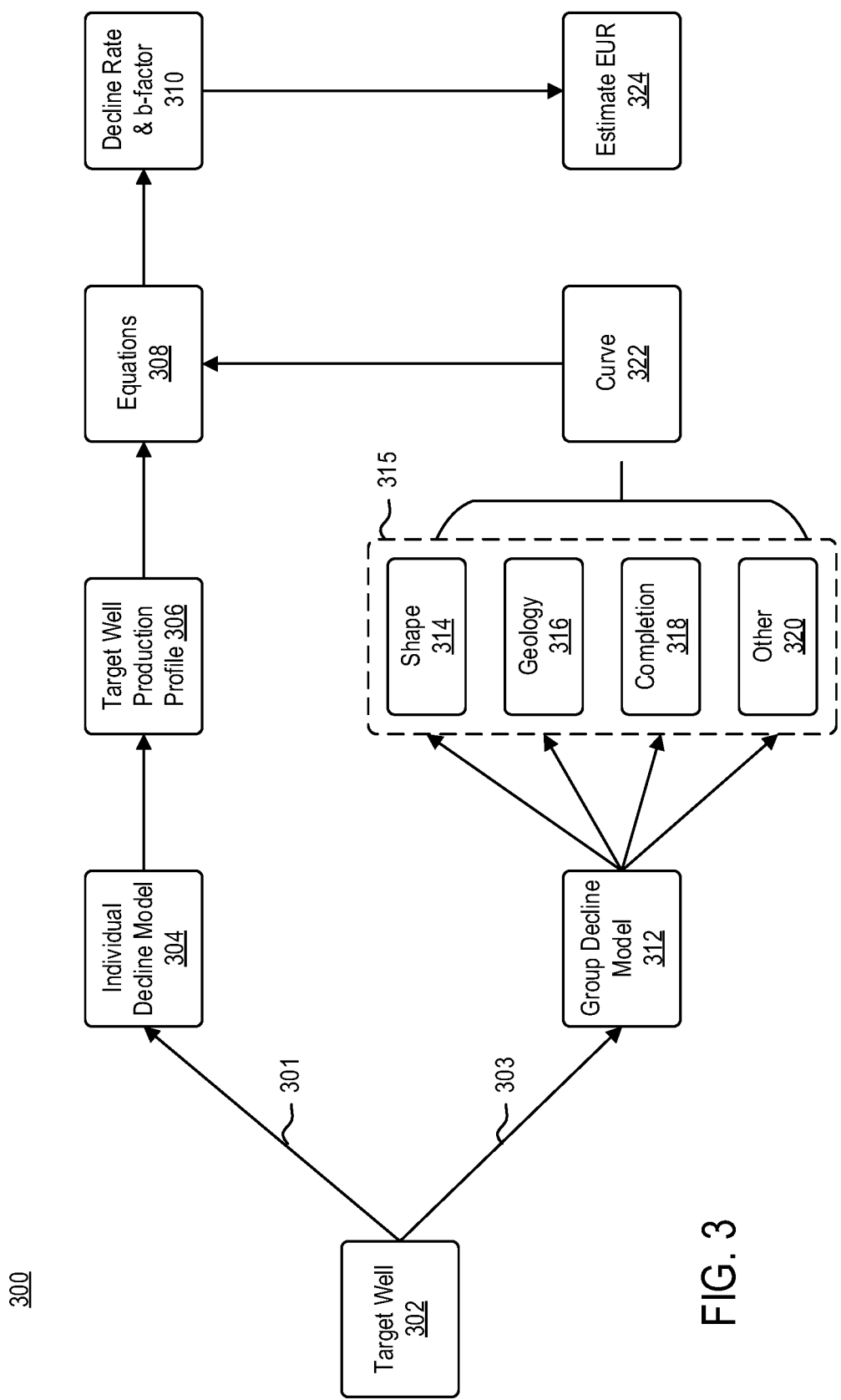
FIG. 3 is a logical diagram illustrating exemplary operations performed in oil and gas predictive analytics, according to one embodiment.

FIG. 3 is a logical diagram illustrating operations performed in oil and gas predictive analytics, according to one embodiment. As illustrated, predictive analytics manager 204 selects target well 302 for analysis. Predictive analytics manager 204 may pass control of the analysis to either long production analysis agent 206 (illustrated by line 301) or short production analysis agent 208 (illustrated by line 303).

Assuming target well 302 includes at least the threshold amount of production information, predictive analytics manager 204 may pass control to long production analysis agent 206. Long production analysis agent 206 may forecast future production of target well 302 using an individual decline model 304. Long production analysis agent 206 may generate a target well production profile 306. For example, long production analysis agent 206 may generate target well production profile 306 by pre-processing the production data to remove one or more outliers, remove any identified downtime, and, subsequently, normalize the data set.

Long production analysis agent 206 may apply one or more equations 308 (e.g., decline curve equations) to the production information included in the target well production profile 306. For example, long production analysis agent 206 may apply one or more Arp's equations to the information included in the target well production profile 306. For example, long production analysis agent 206 may use:

$$Q = \frac{q_i}{D_i(1-b)}\left[1 - \left(\frac{q_i}{q}\right)^{b-1}\right]$$

where $q_i$ is the initial rate, b is the b-factor, and $D_i$ is the decline rate.

In some embodiments, long production analysis agent 206 may apply a hyperbolic decline equation to the information included in the target well production profile 306. In some embodiments, long production analysis agent 206 may apply a harmonic decline equation to the information included in the target well production profile 306. In some embodiments, long production analysis agent 206 may apply an exponential decline equation to the information included in the target well production profile 306.

From equations 308, long production analysis agent 206 may identify the decline rate and b-factor (block 310) from the one or more equations 308 fit to the information included in the target well production profile 306. The decline rate is the rate at which production of oil/gas declines over a period of time, t. The b-factor is a hyperbolic exponent that models one of hyperbolic decline or exponential decline.

Based on the information in block 310 (e.g., decline rate and b-factor), long production analysis agent 206 may determine the EUR 324. EUR 324 is an estimate of the amount of oil or gas that may be recoverable or has already been recovered from a well. Predictive analytics agent 110 may output this information for client device 102.

Assuming target well 302 does not include the threshold amount of production information, predictive analytics manager 204 may pass control to short production analysis agent 208. Short production analysis agent 208 may forecast future production of target well 302 using a group based decline model 312. For example, short production analysis agent 208 may forecast future production of target well 302 using one or more reference wells generated by reference group generator 202.

Short production analysis agent 208 may select a subset of reference wells (block 315) based on one or more characteristics of target well 302. For example, short production analysis agent 208 may select a subset of reference wells based on shape 314 of the target well's production information, geology 316 of the region in which target well 302 is contained and geography 316 of target well 302 (e.g., size, shape, etc.), completion 318 of target well 302, or any other set of criteria 320. In some embodiments, short production analysis agent 208 may select a subset of reference wells based on any of the operations discussed above in conjunction with FIG. 2.

Short production analysis agent 208 may generate a reference curve based on the one or more reference wells. For example, short production analysis agent 208 may average the data associated with a selected subset of reference wells, and generate a reference curve 322 based on the selected subset of reference wells.

Short production analysis agent 208 may apply one or more equations 308 (e.g., decline curve equations) to the information included in reference curve 322. For example, short production analysis agent 208 may apply one or more Arps equations to the information included in reference curve 322. For example, short production analysis agent 208 may use:

$$Q = \frac{q_i}{D_i(1-b)}\left[1 - \left(\frac{q_i}{q}\right)^{b-1}\right]$$

where $q_i$ is the initial rate, b is the b-factor, and $D_i$ is the decline rate.

In some embodiments, short production analysis agent 208 may apply a hyperbolic decline equation to the information included in the reference curve 322. In some embodiments, short production analysis agent 208 may apply a harmonic decline equation to the information included in reference curve 322. In some embodiments, short production analysis agent 208 may apply an exponential decline equation to the information included in reference curve 322.

From equations 308, short production analysis agent 208 may identify the decline rate and b-factor (block 310) from the one or more equations 308 fit to the information included in the reference curve 322. The decline rate is the rate at which production of oil/gas declines over a period, t. The b-factor is a hyperbolic exponent that models one of hyperbolic decline or exponential decline.

Based on the information in block 310 (e.g., decline rate and b-factor), short production analysis agent 208 may determine an estimated ultimate recovery (EUR) 324. EUR 324 is an estimate of the amount of oil or gas that may be recoverable or has already been recovered from a well. Predictive analytics agent 110 may output this information for client device 102.

Figure 4:
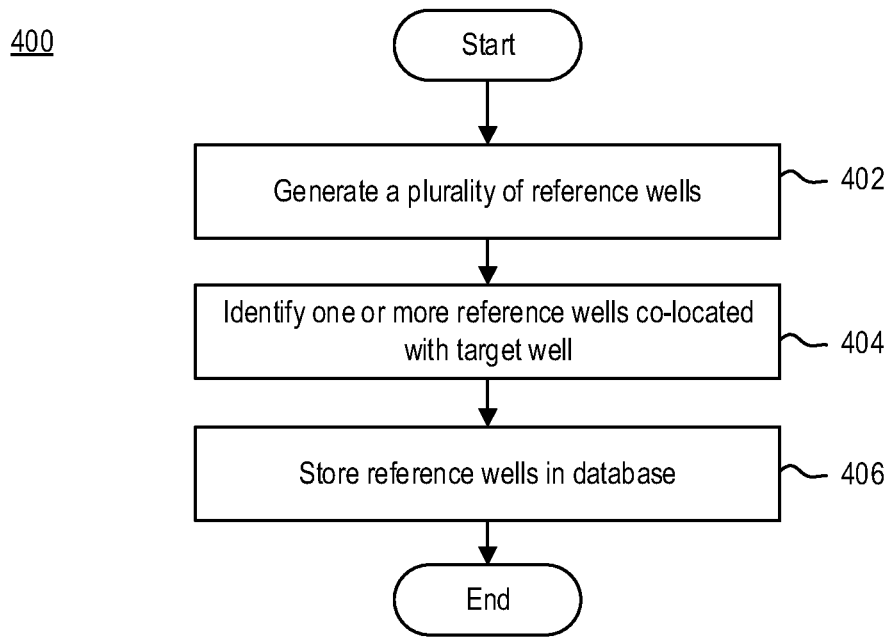
FIG. 4 is a flow diagram illustrating an exemplary method of generating reference groups, according to one embodiment.

FIG. 4 is a flow diagram illustrating a method 400 of generating a set of general reference groups, according to one embodiment. Method 400 begins at step 402. At step 402, reference group generator 202 may generate a plurality of reference wells. Each reference well of the one or more reference wells may include at least the threshold amount of production data.

At step 404, reference group generator 202 may identify one or more reference wells with similarities to the target well. For example, based on information received from client device 102, reference group generator 202 may identify one or more reference wells in the region in which the target well is location.

At step 406, reference group generator 202 may store the plurality of reference wells in database 210. For example, reference group generator 202 may store the one or more generated reference wells as a reference group 212 in database 210. In some embodiments, the one or more generated reference wells in reference group 212 may be stored according to shape 214, play 216, sub-play 218, region 220, operator 222, interval 224, completion 226, or by any suitable characteristic (e.g., other 228).

Figure 9:
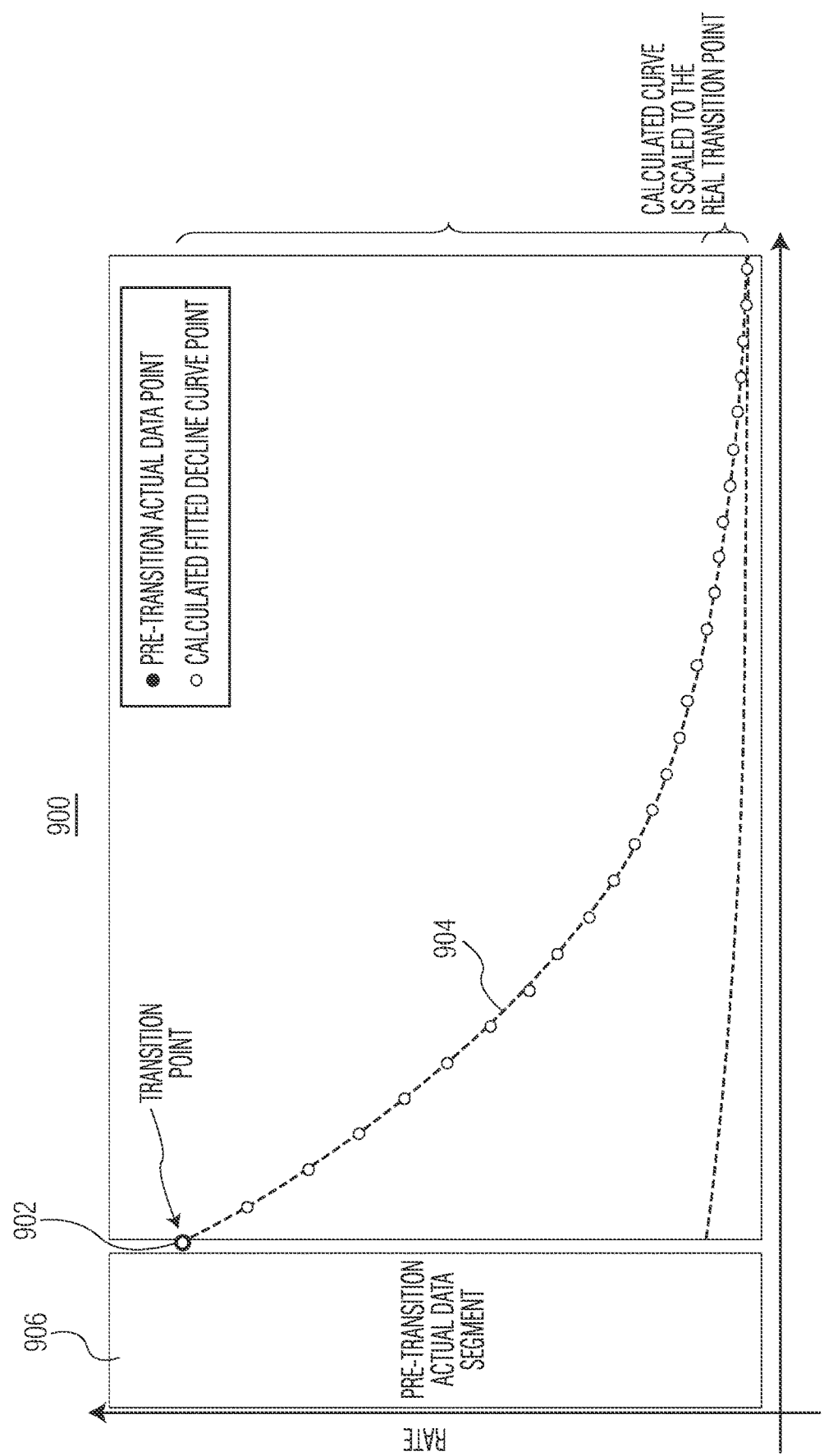
FIG. 9 is a block diagram illustrating an exemplary production curve, according to example embodiments To facilitate understanding, identical reference numerals have been used, where possible, to designate identical elements that are common to the figures. It is contemplated that elements disclosed in one embodiment may be beneficially utilized on other embodiments without specific recitation.

FIG. 9 is a block diagram illustrating an exemplary production curve 900, according to example embodiments.

As illustrated, production curve 900 may include transition point 902. A curve 904 may be generated from transition point 902. Curve 904 may be defined by b, $D_i$, and $q_i$. Area 906 may be representation of pre-transition information that may not be analyzed.

In some embodiments, when the initial rate $q_i$ is allowed to vary during fitting, short production agent 208 may need to adjust the generated curve to the actual peak or transition point of the target curve. For example, the difference between the raw production rate and the fitted curve at the transition point may be calculated (e.g., $q_i\Delta$). In another example, an arithmetic or geometric sequence may be calculated so that the adjustment, $q_i\Delta$, may be spread over a specified first portion of the curve in an organic fashion so that the final point of the real data may be 1% of $q_i\Delta$.

Figure 5:
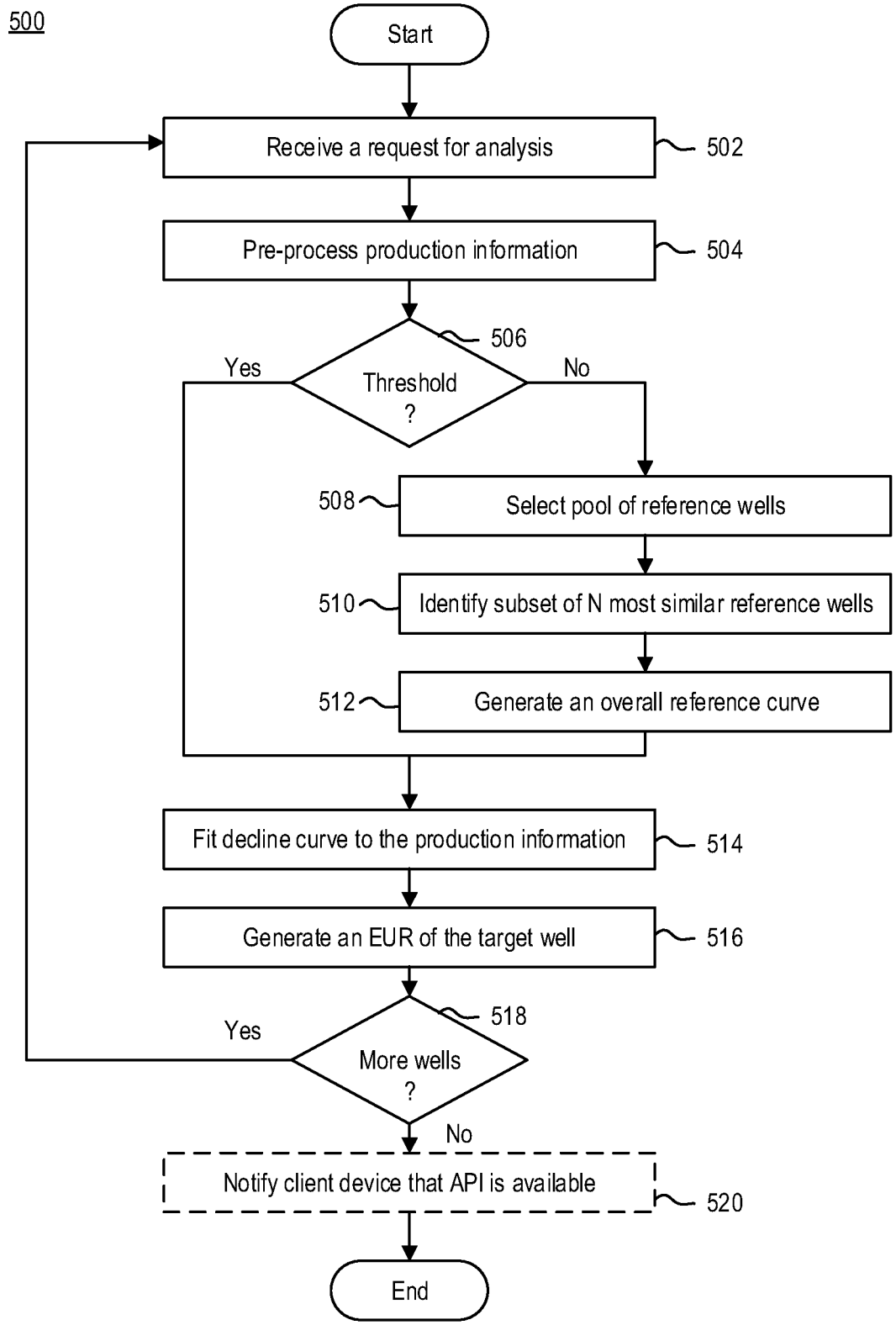
FIG. 5 is a flow diagram illustrating an exemplary method of forecasting further performance of oil and gas wells, according to one embodiment.

FIG. 5 is a flow diagram illustrating a method 500 of forecasting further performance of oil and gas wells, according to one embodiment. For the discussion below in conjunction with method 500, reference well generator 202 has previously pre-generated one or more general reference wells. Those skilled in the art could readily understand, however, that method 500 may include the generation of the general reference wells discussed above in conjunction with FIG. 4.

Method 500 begins at step 502. At step 502, management entity 104 may receive a request from client device 102 to generate a forecast of future performance for a series of target wells. For example, predictive analytics manager 204 of predictive analytics agent 110 executing on management entity 104 may receive the request, and proceed with forecasting future performance of the set of wells. The request may include, for example, a requested target well from a database of wells for analysis.

At step 504, predictive analytics agent 110 may pre-process production information associated with the target well. For example, predictive analytics agent 110 may pre-process the received sets of production information such that the production information is normalized within a pre-defined range. In some embodiments, pre-processing the production data includes removing one or more outliers, removing any identified downtime, and, subsequently, normalizing the data set. After pre-processing the production information, each value in the target well's production information may be within the range of [0,1]. Generally, predictive analytics agent 110 may pre-process production information in accordance with any method discussed above in conjunction with FIG. 2.

At step 506, predictive analytics agent 110 may determine whether the normalized production information includes at least a threshold amount of production information. For example, predictive analytics manager 204 may parse the set of production information for the target well to determine that the set of production information for the target well does not include the threshold amount of production information. In some embodiments, the threshold amount of production information may be point based. For example, predictive analytics manager 204 may determine that the production information for the target well does not include at least the threshold amount of data points. In some embodiments, the threshold amount of production information may be duration based. For example, predictive analytics manager 204 may determine that the production information for the target well does not span a pre-defined duration. In all scenarios, determining whether the production information for the target well includes at least the threshold amount of data aids in determining how to handle the target well for forecasting purposes.

If, at step 506, predictive analytics agent 110 determines that the normalized production information includes at least the threshold amount of production information, then predictive analytics agent 110 may pass control to long production analysis agent 206 to forecast future production of the target well. If, however, at step 506, predictive analytics agent 110 determines that the normalized production information does not include at least the threshold amount of production information, then predictive analytics agent 110 may pass control to short production analysis agent 208 to forecast future production of the target well.

First, assume that predictive analytics agent 110 determines that the normalized production information does not include at least the threshold amount of production information, and, thus, passes control to short production analysis agent 208. Then method 500 proceeds to step 508.

At step 508, upon determining that the set of production information for the well does not include a threshold amount of production information, short production analysis agent 208 may select a pool of reference wells from the general reference groups based on one or more traits of the well. As discussed above, the reference wells generated by reference well generator 202 may be sorted in a hierarchical level. For example, the hierarchy of reference wells may take the form of Trajectory>Region>Basin>Play>Subplay>Interval>Operator>Proppant Intensity Grouping. In some embodiments, the hierarchy of reference wells may include: Region>Basin>Play>Subplay>Interval>Operator. Short production analysis agent 208 may begin by identifying all potential reference wells that have the same features as the above hierarchical levels. Short production analysis agent 208 may transform the additional wells into the general reference group wells generated by reference well generator 202. From the general reference group wells, short production analysis agent may identify a pool of reference wells (e.g., 500 reference wells) based on a degree of granularity, according to the above hierarchy. Generally, short production analysis agent 208 may identify a set of reference wells using a methodology discussed above in conjunction with FIG. 2.

At step 510, short production analysis agent 208 may identify a subset of N most similar reference wells in the pool of reference wells. For example, short production analysis agent 208 may create a normalized production profile for the actual duration of the production of the reference wells. Short production analysis agent 208 may calculate a mean square error (MSE) between the actual curve of each reference well and the reference curve of each reference well as a proxy to a similarity factor. For example, short production analysis agent 208 may compute the mean square error between the target production data to each reference well in the subset of reference wells. If, for example, the target well only includes five months of production information, then short production analysis agent 208 may calculate MSE using the first five months of production information from each reference well in the subset of reference wells. The MSE may be treated as a proxy to a similarity factor.

As previously discussed, all the production information for both the target well and each reference well is normalized between 0 and 1. Thus, if two curves are identical, the MSE should be 0; if totally different (one curve always 0, another always 1), then the MSE should be 1. Accordingly, short production analysis agent 208 may subsequently rank the similarity of each well in the subset of reference wells to the target well, and select a further subset of N reference wells (e.g., 10 reference wells out of 500 reference wells) with the highest similarity factor on a scale of 0 to 1, where 0 is identical and 1 is least similar.

At step 512, short production analysis agent 208 may generate a reference curve for the target well by averaging all curves from the subset N most similar reference curves. In some embodiments, short production analysis agent 208 may cut-off the curve such that at least a pre-defined percentage (e.g., about 60%) of the reference curve information is kept. For example, assume that short production analysis agent 208 selects 20 reference wells for the target well. These 20 reference wells may have different length of production profiles. Assume that eight reference wells may have 30 months of production information, eight reference wells may have months of production information and, four reference wells may have 40 months of production information. If short production analysis agent 208 generates a reference curve by averaging each month's data, short production analysis agent 208 may render a curve with 40 data points. However, the last five data points will only be representative of the four wells having 40 months of production information, and the last ten data points will only be representative of the last twelve wells. To avoid bias in the average curve, short production analysis agent 208 may generate the curve by averaging all reference wells' production curves. Short production analysis agent 208 may then identify how many valid data points were used when averaging the monthly data from all reference wells. Short production analysis agent 208 may identify which month N includes less than 60% of total number of reference well information. Short production analysis agent 208 may discard data points after month N. Continuing with the above example, the month N would be month 35 because at month 36, only 4 data points or 20% of the 20 selected wells are used. Short production analysis agent 208 may then normalize the resulting reference curve.

At step 514 predictive analytics agent 110 may fit a decline curve to the resulting reference curve. For example, predictive analytics agent 110 may apply one or more decline curve equations to the information included in the resulting reference curve. In some embodiments, predictive analytics agent 110 may apply a hyperbolic decline equation to the information included in the resulting reference curve. In some embodiments, predictive analytics agent 110 may apply a harmonic decline equation to the information included in the resulting reference curve. In some embodiments, predictive analytics agent 110 may apply an exponential decline equation to the information included in the resulting reference curve. From the decline curve that was fit to the resulting reference curve, short production analysis agent 208 may identify the decline rate and b-factor. The decline rate is the rate at which production of oil/gas declines over a period, t. The b-factor is a hyperbolic exponent that models one of hyperbolic decline or exponential decline. Based on at least the initial rate $q_i$, decline rate $D_i$, and b-factor, short production analysis agent 208 may determine the EUR.

At step 516 predictive analytics agent 110 may generate the EUR of the target well based on the decline curve that was fit to the resulting reference curve. For example, predictive analytics agent 110 may generate a curve indicative of the EUR of the target well. In some embodiments, predictive analytics agent 110 may generate a curve based on one or more segments. A first segment may be directed to raw production data prior to the peak value. Predictive analytics agent 110 may add back to the fitted decline curve the one or more zero production values. A second segment may be directed to fitted parameters $q_i$, b, $D_i$. Because $q_i$ may not equal the actual peak value of the curve, in order to make the curve more realistic, predictive analytics agent 110 may generate an arithmetic or geometric sequence to weight the adjustment, $q_i\Delta$. This adjust will be spread over a specified first portion of the curve in an organic fashion so that the final point of the real data may be 1% of $q_i\Delta$, and keeping the EUR unchanged. A third segment may be directed to calculating the yearly decline rate of the generated curve. For example, once the decline rate drops below a pre-defined percentage (e.g., 5%) predictive analytics agent 110 may apply a terminal decline with a constant pre-defined percentage (e.g., 5%) per year.

In some embodiments, predictive analytics agent 110 may generate multiple estimates of EUR. For example, predictive analytics agent 110 may generate P10, P50, and P90 estimates of EUR.

Referring to step 506, assume that predictive analytics agent 110 determines that the normalized production information includes at least the threshold amount of production information, and, thus, passes control to long production analysis agent 206. Method 500 proceeds to step 514.

At step 514, predictive analytics agent 110 may fit a decline curve to the normalized production information. In some embodiments, predictive analytics agent 110 may apply a hyperbolic decline equation to the normalized production information. In some embodiments, predictive analytics agent 110 may apply a harmonic decline equation to the normalized production information. In some embodiments, predictive analytics agent 110 may apply an exponential decline equation to the normalized production information. From the decline curve that was fit to the normalized production information, long production analysis agent 206 may identify the decline rate and b-factor. The decline rate is the rate at which production of oil/gas declines over a period of time, t. The b-factor is a hyperbolic exponent that models one of hyperbolic decline or exponential decline. Based on at least the initial rate qi, decline rate $D_i$, and b-factor, long production analysis agent 206 may determine the EUR.

At step 516, predictive analytics agent 110 may generate the EUR of the target well based on the decline curve that was fit to the normalized production information. For example, predictive analytics agent 110 may generate a curve indicative of the EUR of the target well. In some embodiments, predictive analytics agent 110 may generate the curve based on one or more segments. A first segment may be directed to raw production data prior to the peak value. Predictive analytics agent may 110 may add back to the fitted decline curve the one or more zero production values. A second segment may be directed to fitted parameters $q_i$, b, $D_i$. Because $q_i$ may not equal the actual peak value of the curve, in order to make the curve more realistic, predictive analytics agent 110 may generate an arithmetic or geometric sequence to weight the adjustment, $q_i\Delta$. This adjust will be spread over a specified first portion of the curve in an organic fashion so that the final point of the real data may be 1% of $q_i\Delta$ and keeping the EUR unchanged. A third segment may be directed to calculating the yearly decline rate of the generated curve. For example, once the decline rate drops below a pre-defined percentage (e.g., 5%) predictive analytics agent 110 may apply a terminal decline with a constant pre-defined percentage (e.g., 5%) per year.

In some embodiments, predictive analytics agent 110 may generate multiple estimates of EUR. For example, predictive analytics agent 110 may generate P10, P50, and P90 estimates of EUR.

At step 518 predictive analytics agent 110 determines whether there are any remaining target wells in the series of target wells for analysis. If predictive analytics agent 110 determines that there are remaining target wells in the series of target wells for analysis, method 500 reverts to step 502.

However, if predictive analytics agent 110 determines that there are no remaining target wells in the series of target wells for analysis, at step 520 predictive analytics agent 110 may notify client device 102 that an API is available to access results of the analysis. For example, predictive analytics agent 110 may generate an API to display the EUR and, subsequently, notify client device 102 that the API is available. Client device 102 may subsequently receive the notification from management entity 104 and access the EUR via the API. For example, client device 102 may access the EUR via application 106 executing on client device 102.

Figure 6:
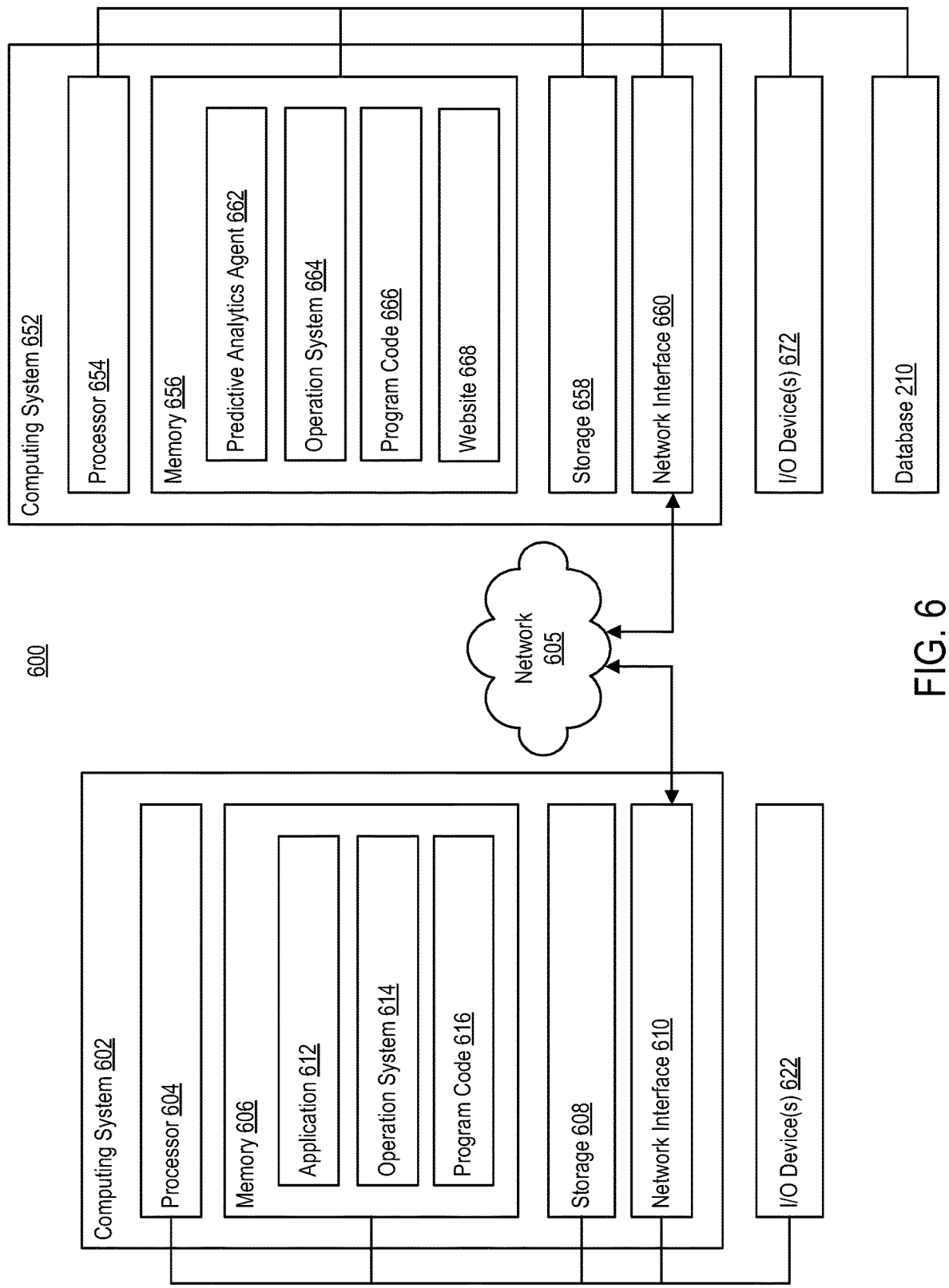
FIG. 6 is a block diagram illustrating an exemplary computing environment, according to one embodiment.

FIG. 6 illustrates a computing environment 600, according to one embodiment. Computing environment 600 includes computing system 602 and computing system 652 communicating over network 605. Computing system 602 may be representative of client device 102. Computing system 652 may be representative of management entity 104.

Computing system 602 may include processor 604, memory 606, storage 608, and network interface 610. In some embodiments, computing system 602 may be coupled to one or more I/O devices 622 (e.g., keyboard, mouse, monitor, etc.).

Processor 604 retrieves and executes program code 616 (i.e., programming instructions) stored in memory 606, as well as stores and retrieves application data. Processor 604 may be representative of a single processor, multiple processors, a single processor having multiple processing cores, and the like. Network interface 610 may be any type of network communications enabling computing system 602 to communicate externally via network 605. For example, network interface 610 may allow computing system 602 to communicate with computing system 652.

Storage 608 may be, for example, a disk storage device. Although shown as a single unit, storage 608 may be a combination of fixed and/or removable storage devices, such as fixed disk drives, removable memory cards, optical storage, network attached storage (NAS), storage area network (SAN), and the like.

Memory 606 may include application 612, operating system 614, and program code 616. Program code 616 may be accessed by processor 604 for processing (i.e., executing program instructions). Program code 616 may include, for example, executable instructions configured to perform steps discussed above in conjunction with FIGS. 4-6. For example, program code 616 may include executable instructions for communicating with computer system 652 to display one or more pages of website 668. Application 612 may provide access to functionality of computing system 652. For example, application 612 may provide access to predictive analytics agent 110 executing on computing system 652, via a website 668, as well as functionality of website 668. The content that is displayed to a user of computing system 602 may be transmitted from computing system 652 to computing system 602, and subsequently processed by application 612 for display through a GUI of computing system 602.

Computing system 652 may include processor 654, memory 656, storage 658, and network interface 660. In some embodiments, computing system 652 may be coupled to one or more I/O devices 672. In some embodiments, computing system 652 may further be coupled to database 210.

Processor 654 retrieves and executes program code 666 (i.e., programming instructions) stored in memory 656 as well as stores and retrieves application data. Processor 654 may be representative of a single processor, multiple processors, a single processor having multiple processing cores, and the like. Network interface 660 may be any type of network communications enabling computing system 652 to communicate externally via network 605. For example, network interface 660 may allow computing system 652 to communicate with computing system 602.

Storage 658 may be, for example, a disk storage device. Although shown as a single unit, storage 658 may be a combination of fixed and/or removable storage devices, such as fixed disk drives, removable memory cards, optical storage, network attached storage (NAS), storage area network (SAN), and the like.

Memory 656 may include predictive analytics agent 662, operating system 664, program code 666, and website 668. Predictive analytics agent 662 may be configured to forecast future performance of oil and gas wells. For example, predictive analytics agent 662 may receive, as input, a set of data points associated with a performance history of the well, and perform a decline curve analysis using the set of data points to forecast future performance of oil and gas wells.

Program code 666 may be accessed by processor 654 for processing (i.e., executing program instructions). Program code 666 may include, for example, executable instructions configured to perform steps discussed above in conjunction with FIGS. 4-6. Website 668 may be accessed by computing system 602. For example, website 668 may include content accessed by computing system 602 via web browser or application.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A method, comprising:
    identifying, by a computing system, a set of production information for a well located in a region, the set of production information directed to past production of the well;
    partitioning, by the computing system, a curve representing the past production of the well into a plurality of segments;
    determining, by the computing system, that each segment of the plurality of segments comprises a first set of production information that includes a threshold amount of production information;
    based on the determining, fitting, by the computing system, a decline curve to the first set of production information using a decline curve model; and
    generating, by the computing system, an estimated ultimate recovery of the well based on the decline curve.

2. The method of claim 1, wherein fitting, by the computing system, the decline curve to the first set of production information using the decline curve model comprises:
    identifying a peak producing rate in the first set of production information; and
    fitting the decline curve to the first set of production information based on the peak producing rate.

3. The method of claim 1, wherein fitting, by the computing system, the decline curve to the first set of production information using the decline curve model comprises:
    determining that multiple peaks in production rate in the first set of production information exist; and
    based on the determining that the multiple peaks in the production rate in the first set of production information exist, utilizing a transition point detection algorithm for identifying a transition point in the production rate in the first set of production information.

4. The method of claim 3, wherein utilizing the transition point detection algorithm for identifying the transition point in the production rate in the first set of production information comprises:
    iteratively comparing each of the multiple peaks to determine which peak of the multiple peaks is the transition point.

5. The method of claim 1, wherein fitting, by the computing system, the decline curve to the first set of production information using the decline curve model comprises:
    determining that multiple peaks in production rate in the first set of production information exist;
    identifying a set of candidate transition points based on the multiple peaks;
    fitting individual decline curves to the set of candidate transition points; and
    identifying an actual transition point based on a candidate transition point from the set of candidate transition points that yielded a lowest root mean square error.

6. The method of claim 1, wherein partitioning, by the computing system, the curve representing the past production of the well into the plurality of segments comprises:
    applying a step detection process to the curve.

7. The method of claim 1, wherein partitioning, by the computing system, the curve representing the past production of the well into the plurality of segments comprises:
    identifying one or more points of change in a time series representation of the first set of production information; and partitioning the curve based on the one or more points of change.

8. A non-transitory computer readable medium comprising one or more sequences of instructions, which, when executed by a processor, causes a computing system to perform operations comprising:
 identifying, by the computing system, a set of production information for a well located in a region, the set of production information directed to past production of the well;
 partitioning, by the computing system, a curve representing the past production of the well into a plurality of segments;
 determining, by the computing system, that each segment of the plurality of segments comprises a first set of production information that includes a threshold amount of production information;
 based on the determining, fitting, by the computing system, a decline curve to the first set of production information using a decline curve model; and
 generating, by the computing system, an estimated ultimate recovery of the well based on the decline curve.

9. The non-transitory computer readable medium of claim 8, wherein fitting, by the computing system, the decline curve to the first set of production information using the decline curve model comprises:
 identifying a peak producing rate in the first set of production information; and
 fitting the decline curve to the first set of production information based on the peak producing rate.

10. The non-transitory computer readable medium of claim 8, wherein fitting, by the computing system, the decline curve to the first set of production information using the decline curve model comprises:
 determining that multiple peaks in production rate in the first set of production information exist; and
 based on the determining that the multiple peaks in the production rate in the first set of production information exist, utilizing a transition point detection algorithm for identifying a transition point in the production rate in the first set of production information.

11. The non-transitory computer readable medium of claim 10, wherein utilizing the transition point detection algorithm for identifying the transition point in the production rate in the first set of production information comprises:
 iteratively comparing each of the multiple peaks to determine which peak of the multiple peaks is the transition point.

12. The non-transitory computer readable medium of claim 8, wherein fitting, by the computing system, the decline curve to the first set of production information using the decline curve model comprises:
 determining that multiple peaks in production rate in the first set of production information exist;
 identifying a set of candidate transition points based on the multiple peaks;
 fitting individual decline curves to the set of candidate transition points; and
 identifying an actual transition point based on a candidate transition point from the set of candidate transition points that yielded a lowest root mean square error.

13. The non-transitory computer readable medium of claim 8, wherein partitioning, by the computing system, the curve representing the past production of the well into the plurality of segments comprises:
 applying a step detection process to the curve.

14. The non-transitory computer readable medium of claim 8, wherein partitioning, by the computing system, the curve representing the past production of the well into the plurality of segments comprises:
 identifying one or more points of change in a time series representation of the first set of production information; and
 partitioning the curve based on the one or more points of change.

15. A system, comprising:
 a processor; and
 a memory having programming instructions stored thereon, which, when executed by the processor, causes the system to perform operations comprising:
  identifying a set of production information for a well located in a region, the set of production information directed to past production of the well;
  partitioning a curve representing the past production of the well into a plurality of segments;
  determining that each segment of the plurality of segments comprises a first set of production information that includes a threshold amount of production information;
  based on the determining, fitting a decline curve to the first set of production information using a decline curve model; and
  generating an estimated ultimate recovery of the well based on the decline curve.

16. The system of claim 15, wherein fitting the decline curve to the first set of production information using the decline curve model comprises:
 identifying a peak producing rate in the first set of production information; and
 fitting the decline curve to the first set of production information based on the peak producing rate.

17. The system of claim 15, wherein fitting the decline curve to the first set of production information using the decline curve model comprises:
 determining that multiple peaks in production rate in the first set of production information exist; and
 based on the determining that the multiple peaks in the production rate in the first set of production information exist, utilizing a transition point detection algorithm for identifying a transition point in the production rate in the first set of production information.

18. The system of claim 15, wherein fitting the decline curve to the first set of production information using the decline curve model comprises:
 determining that multiple peaks in production rate in the first set of production information exist;
 identifying a set of candidate transition points based on the multiple peaks;
 fitting individual decline curves to the set of candidate transition points; and
 identifying an actual transition point based on a candidate transition point from the set of candidate transition points that yielded a lowest root mean square error.

19. The system of claim 15, wherein partitioning the curve representing the past production of the well into the plurality of segments comprises:
 applying a step detection process to the curve.

20. The system of claim 15, wherein partitioning the curve representing the past production of the well into the plurality of segments comprises:

identifying one or more points of change in a time series representation of the first set of production information; and partitioning the curve based on the one or more points of change.

* * * * *